April 4, 1967  K. MEIER ET AL  3,312,124
STEERING-WHEEL ASSEMBLY FOR AUTOMOTIVE VEHICLES
Filed Dec. 13, 1965  3 Sheets-Sheet 1

KLAUS MEIER
KARL MEIER
INVENTORS

BY

Karl F. Ross
Attorney

KLAUS MEIER
KARL MEIER
INVENTORS

April 4, 1967   K. MEIER ETAL   3,312,124
STEERING-WHEEL ASSEMBLY FOR AUTOMOTIVE VEHICLES
Filed Dec. 13, 1965   3 Sheets-Sheet 3
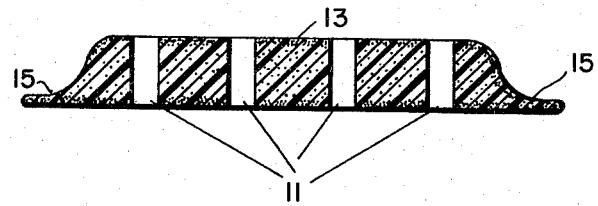
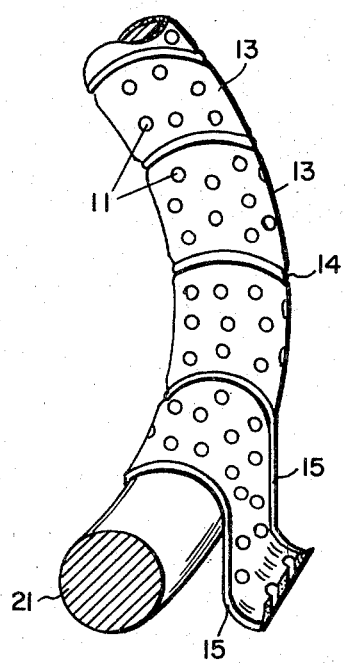
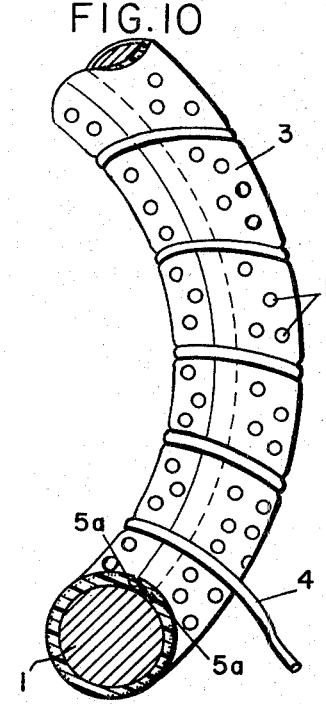
KLAUS MEIER
KARL MEIER
*INVENTORS*
BY
*Karl G. Ross*
*Attorney*

United States Patent Office 3,312,124
Patented Apr. 4, 1967

3,312,124
STEERING-WHEEL ASSEMBLY FOR AUTOMOTIVE VEHICLES
Klaus Meier and Karl Meier, both of Wolfsburg, Germany, assignors to Kamei-Autokomfort, Wolfsburg, Germany, a corporation of Germany
Filed Dec. 13, 1965, Ser. No. 513,346
Claims priority, application Germany, Dec. 14, 1964, K 49,798; Feb. 26, 1965, K 55,392; Oct. 28, 1965, K 57,515; Nov. 30, 1965, K 52,877
8 Claims. (Cl. 74—558)

Our present invention relates to a steering-wheel assembly for automotive vehicles and, more particularly, to a steering-wheel cover adapted to improve the grip of the operator upon the vehicle-steering wheel and to eliminate inconveniences resulting from extreme steering-wheel temperatures.

Steering-wheel covers and the like composed of fabric or synthetic resin and affixed to the steering wheel by various forms of holding devices, e.g. elastic bands, have been proposed heretofore. In general, such steering-wheel covers are unsatisfactory in that they frequently move relative to the steering-wheel crown, do not afford a satisfactory grip for the driver, and have projecting portions interfering with the steering operation.

It is, therefore, the principal object of the present invention to provide an improved steering-wheel cover and steering-wheel assembly including such a cover whereby the aforementioned disadvantages can be avoided and the steering-wheel cover can have an improved grip on the steering wheel while affording more satisfactory handling to the vehicle operator.

This object and others which will become apparent hereinafter are attained, in accordance with the present invention, by an assembly including a steering-wheel cover of foamed and preferably elastomeric synthetic resin, wherein a pair of surface skins sandwich between them a porous core of the synthetic resin, which envelops the steering-wheel crown and is held thereon by a generally helical winding, the cover being integrally formed with the cellular core and the nonporous skin layers and having throughgoing perforations designed to permit, upon engagement of the cover by the hands of the vehicle operator an eduction of air from and an induction of air into the cover. The latter preferably is formed by a relatively wide band whose longitudinal edges are beveled so that they can overlap when the band is helically wound around the steering-wheel crown or folded in a U-configuration; the band preferably co-operates with a tie cord of generally elliptical or flattened cross-section and wound helically about the foamed band so as to form surface contours on the outer surfaces of the band which improve the grippability of the cover. Advantageously, this tie cord is affixed, at least at one extremity thereof, to a foam band which can be made endless by joining the ends of the band in a seam at which the tie cord is affixed to the cover. It will be understood that this arrangement eliminates any possibility that portions of the cover can extend tangentially to the steering-wheel crown and thus improve the maneuverability of the hands of the vehicle operator. The flattened character of the tie cord provides only minor crevices so that dirt and dust do not tend to accumulate on the device and the cord is preferably elastic so as to maintain an inward compression upon the cover. The latter likewise can be elastic for this purpose and may be composed of an elastomeric thermoplastic material capable of heat-sealing to bevel the longitudinal edges, join its ends and affix the tie cord thereto.

The above and other objects, features and advantages of the present invention will become more readily apparent from the following description, reference being made to the accompanying drawing in which:

FIG. 8 is a transverse cross-sectional view through a wind-around cover embodying the principles of the present invention;

FIG. 9 is a fragmentary perspective view of a steering-wheel assembly using a cover of the latter type; and FIG. 10 is a view similar to FIG. 9 illustrating another modification of the cover of the present invention.

Figure 1:
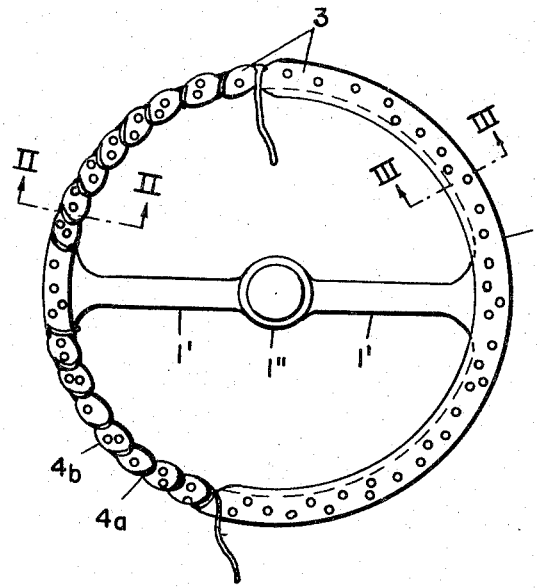
FIG. 1 is a plan view of an automotive steering wheel provided with a steering-wheel cover in accordance with the present invention, showing the cover partly fixed in place.
Figure 3:
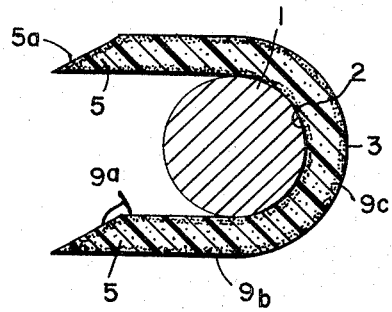
FIG. 3 is a cross-sectional view taken along the line III—III of FIG. 1 illustrating the cover prior to the fixing thereof to the steering wheel.

In FIG. 1, we show a steering-wheel crown 1 for an automotive vehicle which is connected by spokes 1' with a hub 1" mounted upon the steering post of the vehicle. The steering wheel 1 is enveloped by a cover 3 held in place by a tie cord 4 wound generally helically around the cover, as shown at the left-hand side of FIG. 1, to hold the cover in frictional engagement with the toroidal wheel and providing a discontinuous gripping surface. The cover 3 is relatively wide (i.e. with a width equal substantially to $\pi D$ where $D = d + 2d'$, $d$ being defined as the overall diameter of the steering wheel crown and $d'$ as the thickness of the cover 3). According to one feature of this invention, the cover 3 is an endless band and has a length equal at least to the circumference of the crown and is bent around the latter with a U-shaped configuration, as illustrated in FIG. 3, the shanks 5 of the U extending inwardly whereas the bight of the U is formed by the outer semi-toroidal surface of the steering-wheel crown 1. The cover 3 has a frictional surface 2 formed by a foam layer which, as will be described in greater detail with reference to FIGS. 5 and 8 hereinafter, is integral with the remainder of the cover. The frictional surface 2 can be formed by an inner layer 9a of the elastomeric foamed synthetic resin while an outer layer 9b is correspondingly provided; a cellular core 9c is disposed between these layers.

Figure 2:
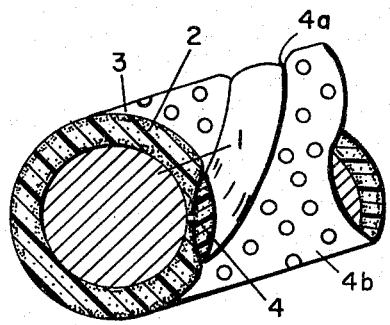
FIG. 2 is a cross-sectional view taken generally along the line II—II of FIG. 1 and partly in elevation.
Figure 4:
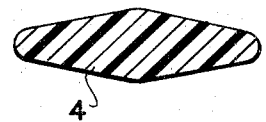
FIG. 4 is an enlarged cross-sectional view through a tie cord for the cover.

As can be seen from FIGS. 1 and 2, after the cover 3 is mounted upon the steering-wheel crown 1, the tie cord 4, of proportionately small width and cross-section by comparison with the cover band 3, is wound generally helically about the cover to hold it against the steering-wheel crown 1 while forming shallow helical indentations 4a between helical bulges 4b to produce a substantially discontinuous surface. As can be seen from FIGS. 2 and 4, this tie cord 4 is a band of substantially elliptical configuration with a generally flat side lying against the cover so that deep indentations into the cover are prevented and dirt-retaining pockets are avoided. This has been found to be important also since the manipulations of the steering wheel often apply considerable stress to the cover and, if the tie cord is formed with a sharp contact edge or penetrates the cover band deeply, it is observed that a tearing action occurs. The winding of the tie cord 4 about the cover 3 closes the U by holding the shanks 5 inwardly and guaranteeing an all-around contact of the band 3 with the steering-wheel crown. After winding the tie cord 4, as indicated in FIG. 1, the ends of the cord can be tied at the right-hand side of the steering wheel.

Figure 5:
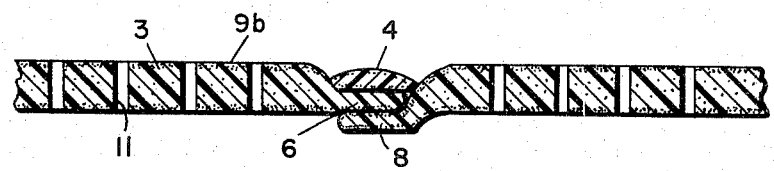
FIG. 5 is a longitudinal cross-sectional view through an endless cover in accordance with this invention, showing only the seam region thereof.
Figure 6:
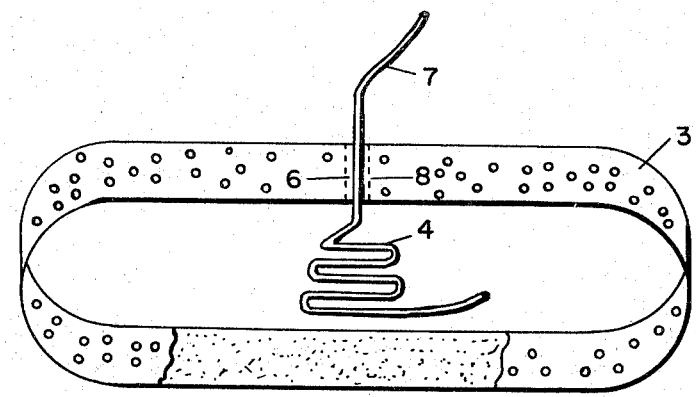
FIG. 6 is a perspective view of the cover prior to mounting it upon the steering wheel.
Figure 7:
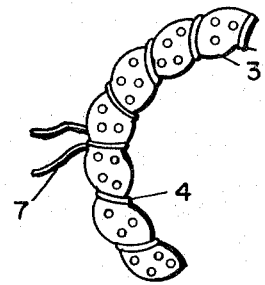
FIG. 7 is a fragmentary view similar to FIG. 1 showing the final step in mounting the cover.

Referring now to FIGS. 5–7, it will be seen that the tie cord 4, instead of being independent of the band 3, can be bonded thereto in order to establish the tying location and to prevent loss of the cord. In this case, the tie cord 4 which can be composed of an elastic thermoplastic material like the foam cover band 3, may be thermally welded (heat-sealed) to one end 6 of the band 3, sewed onto this end, threaded through the band, cemented thereto or otherwise permanently connected to it. The end 6 of the band 3 is recessed so that the tie cord 4 can lie below the outer surface 9b, thereby reducing any tendency to dislodge the tie cord from the band. The end 6 overlies a flap 8 to which it is heat-sealed or otherwise connected to produce an endless cover from the foamed synthetic resin band. One end 7 of the tie cord 4 has a length of several centimeters for use in tying the longer end which is wound about the cover 3, as previously described. This arrangement has the important advantage that one end of the tie cord 4 is always fixed (FIG. 7) with respect to the band and the tie cord can then be wound under tension about the cover 3 without problems resulting from movement of the other end. This has been found to improve the grip with which the cover 3 hugs the steering-wheel crown.

According to an essential feature of this invention, best seen in FIGS. 3, 5 and 6, the cover band 3 is integrally (i.e. unitarily) formed from foamed synthetic resin with a nonporous or "closed" skin 9b along its outer surface and a similar nonporous skin 9a along its inner surface. The skins 9a and 9b form high-strength layers in one-piece or monolithic connection with the highly porous and relatively yieldable core 9c and can be formed during the normal production of the band. Thus, if the foamed band is a polyvinyl chloride or other thermoplastic foam, the imperforate skins can be produced by calendering the foamed band at a temperature in the region of the softening point thereof and without completely compressing the band. This process, carried out during production of the foam, forms a relatively tough skin. We have found that sweating of the steering wheel beneath the cover can be eliminated and the cover maintained in a better condition for longer operation periods when it is provided with a multiplicity of throughgoing perforations which pass through both of the skins as well as the yieldable foam core between them. Such perforations are illustrated at 11 in the drawing and have been found to be effective when the operator of the vehicle grips the steering wheel to force air out of the cellular foam and then, upon release of the cover, permits air to flow into the cover. Not only do the perforations 11 thus permit the cover to breathe internally and afford access of air to the steering wheel crown, but they also serve to improve the grippability of the outer surface. The normal hand-over-hand steering operation produces a pumping action over substantially the entire cover band to eliminate any possibility of stagnation within the cells of the cover.

We have also discovered that best results are obtained when, as illustrated in FIG. 10, the ends of the shanks 5 are beveled outwardly at 5a so that they can overlap (FIG. 10). This arrangement prevents the formation of a bead along the line at which the ends of the shanks come together, thereby permitting this line of junction to be substantially anywhere along the steering wheel crown. When the cover 13 is formed by a band helically wound about the steering wheel 21 (FIG. 9), a helical seam can be avoided by beveling the longitudinal edges 15 of the band, as can be seen in FIGS. 8 and 9. The beveled edges 15 can overlap and a tie cord can be provided, if desired, in the helical recess 14 formed between adjacent turns. Because of the overlap of the longitudinal edges 15 of the band 13 (FIG. 9), the band can be used upon steering wheels of different thicknesses without difficulty even though, in the system of FIG. 10, a relatively narrow steering wheel would have produced a bead in the absence of such beveling.

The invention described and illustrated is believed to admit of many modifications within the ability of persons skilled in the art, all such modifications being considered within the spirit and scope of the appended claims.

We claim:

1. In a steering-wheel assembly having a steering-wheel crown, the improvement which comprises a steering-wheel cover enveloping said crown and formed from a band having a core of porous foamed material and a pair of nonporous surface skins of said material unitarily connected with said core and sandwiching said core between them, said band being provided with a multiplicity of throughgoing perforations extending substantially to said crown.

2. The improvement defined in claim 1 wherein said band is formed with beveled longitudinal edges overlappable upon encompassing said steering-wheel crown in said band.

3. The improvement defined in claim 1, further comprising a relatively narrow tie cord wound generally helically around said band for securing it to said steering-wheel crown, said tie cord having a generally flattened elliptical cross-section and bearing with a broad surface against said band.

4. The improvement defined in claim 3 wherein said tie cord is composed of an elastic material.

5. The improvement defined in claim 3 wherein said tie cord is secured at one end thereof to said band and is formed at said end with a relatively short tying portion, the remainder of said tie cord being windable around said band on said crown.

6. The improvement defined in claim 5 wherein said band has a pair of extremities drawing together at a seam, said tie cord being secured to said band at said seam.

7. The improvement as defined in claim 1 wherein said band is wound generally helically around said steering-wheel crown.

8. The improvement defined in claim 1 wherein said band is composed of an elastic thermoplastic material.

No references cited.

FRED C. MATTERN, JR., *Primary Examiner.*